(12) United States Patent
Umayahara et al.

(10) Patent No.: US 8,722,265 B2
(45) Date of Patent: May 13, 2014

(54) FUEL CELL SYSTEM

(75) Inventors: Kenji Umayahara, Nishikamo-gun (JP);
Michio Yoshida, Nishikamo-gun (JP)

(73) Assignee: Toyota Jidosha Kabushiki Kaisha,
Toyota-Shi (JP)

( * ) Notice: Subject to any disclaimer, the term of this patent is extended or adjusted under 35 U.S.C. 154(b) by 317 days.

(21) Appl. No.: 12/743,896

(22) PCT Filed: Nov. 11, 2008

(86) PCT No.: PCT/JP2008/070488
§ 371 (c)(1),
(2), (4) Date: May 20, 2010

(87) PCT Pub. No.: WO2009/066586
PCT Pub. Date: May 28, 2009

(65) Prior Publication Data
US 2010/0248053 A1    Sep. 30, 2010

(30) Foreign Application Priority Data
Nov. 21, 2007    (JP) .................................. 2007-301875

(51) Int. Cl.
*H01M 8/04*    (2006.01)
(52) U.S. Cl.
USPC .......................................... 429/432; 429/428
(58) Field of Classification Search
USPC ................................ 429/432, 428
See application file for complete search history.

(56) References Cited
U.S. PATENT DOCUMENTS
2004/0056633 A1*    3/2004    Sugiura et al. ................ 320/101

FOREIGN PATENT DOCUMENTS

| | | |
|---|---|---|
| JP | 61-233975 A | 10/1986 |
| JP | 61-284065 A | 12/1986 |
| JP | 63-181268 A | 7/1988 |
| JP | 03-025861 A | 2/1991 |
| JP | 07-045298 A | 2/1995 |
| JP | 07-240212 A | 9/1995 |
| JP | 10-271706 A | 10/1998 |
| JP | 2003-197210 A | 7/2003 |
| JP | 2004-281219 A | 10/2004 |
| JP | 2006-032169 A | 2/2006 |
| JP | 2006-141097 A | 6/2006 |
| JP | 2006-210057 A | 8/2006 |
| JP | 2006-252918 A | 9/2006 |
| JP | 2007-026891 A | 2/2007 |
| JP | 2007-026933 A | 2/2007 |
| JP | 2007-109569 A | 4/2007 |
| WO | WO 02/15316 A1 | 2/2002 |
| WO | 2006136934 A1 | 12/2006 |
| WO | WO 2006/136934 * | 12/2006 .............. H01M 8/04 |

OTHER PUBLICATIONS

Extended European Search Report dated May 18, 2011.

* cited by examiner

*Primary Examiner* — Jonathan G Leong
*Assistant Examiner* — James Erwin
(74) *Attorney, Agent, or Firm* — Kenyon & Kenyon LLP

(57) ABSTRACT

A fuel cell system is provided which can extend the time during which a high-potential avoidance control is performed as much as possible, thereby reducing deterioration of a fuel cell. The fuel cell system includes: a fuel cell that generates electric power upon a supply of a reaction gas; a power storage device that is charged with at least a part of power generated by the fuel cell; and a controller that controls an output voltage of the fuel cell with, as an upper limit, a high-potential avoidance voltage lower than an open end voltage thereof. The controller variably sets the high-potential avoidance voltage in accordance with the amount of charge SOC of the power storage device.

5 Claims, 4 Drawing Sheets

FUEL CELL SYSTEM

This is a 371 national phase application of PCT/JP2008/070488 filed 11 Nov. 2008, which claims priority to Japanese Patent Application No. 2007-301875 filed 21 Nov. 2007, the contents of which are incorporated herein by reference.

TECHNICAL FIELD

The present invention relates to a fuel cell system that controls an output voltage of a fuel cell with, as an upper limit, a high-potential avoidance voltage lower than an open end voltage of the fuel cell.

BACKGROUND ART

A fuel cell stack is a power generation system in which a fuel is oxidized by an electrochemical process, whereby energy emitted through an oxidation reaction is directly converted into electric energy. The fuel cell stack has a membrane-electrode assembly in which a polymer electrolyte membrane for selectively transporting hydrogen ions is sandwiched, on both of its sides, by a pair of electrodes formed of a porous material. Each of the electrodes of the pair contains, as its main constituent, carbon powder that carries a platinum-based metal catalyst, and includes a catalyst layer in contact with the polymer electrolyte membrane and a gas diffusion layer which is formed on the surface of the catalyst layer and which has both permeability and electronic conductivity.

WO2002/015316 discloses a fuel cell vehicle on which a fuel cell system is mounted as a power source. A power storage device mounted on this fuel cell vehicle supplies current to a load when a current supplied from a fuel cell stack is smaller than a current required by the load, while storing regenerative power collected by the load and power generated by the fuel cell stack. The above publication also discloses that the distribution state of the current flowing to the fuel cell stack and the power storage device is controlled suitably, thereby suitably performing charging of the power storage device without increasing the capacity of the power storage device.

Meanwhile, when an output voltage of the fuel cell stack changes to be within the range of high potential, this might advance deterioration of the fuel cell stack. This is because the platinum catalyst contained in the catalyst layer of the membrane-electrode assembly is ionized to dissolve in a high-potential environment. In order to prevent such disadvantages, as disclosed in Japanese laid-open patent publication 2007-109569, a method of performing power generation control so as to prevent an output voltage of a fuel cell stack from exceeding a predetermined upper limit voltage (hereinafter, referred to as high-potential avoidance voltage) (hereinafter, referred to as high-potential avoidance control) has been known.

In such a fuel cell system having a high-potential avoidance control function, power generation of the fuel cell stack occurs through the high-potential avoidance control even when the fuel cell stack is required to generate electric power, and therefore, electric power is provided only to a power storage device in the case of a low load such as an idle stop. In light of such circumstances, when an amount of charge of a power storage device exceeds a predetermined threshold, a high-potential avoidance control has been prohibited, and the voltage of a fuel cell stack has been increased to an open end voltage, thereby avoiding overcharge of the power storage device.

Patent Document 1: WO2002/015316
Patent Document 2: Japanese laid-open patent publication No. 2007-109569

DISCLOSURE OF THE INVENTION

Problem to be Solved by the Invention

However, when the high-potential avoidance voltage is fixed at a constant voltage, power generated through the high-potential avoidance control has a constant value irrespective of the state of charge of the power storage device. Therefore, if the amount of charge of the power storage device is in the vicinity of a predetermined threshold, the amount of charge of the power storage device easily exceeds the predetermined threshold by performing the high-potential avoidance control. This means that opportunities for the state of the high-potential avoidance control to be shifted from a permitted state to a prohibited state increase, which results in the advancement of deterioration of the fuel cell stack.

In light of the above problems, an object of the present invention is to provide a fuel cell system which can extend the time during which a high-potential avoidance control is performed as much as possible.

Means for Solving the Problems

In order to achieve the above object, the fuel cell system according to the present invention includes: a fuel cell that generates electric power upon a supply of a reaction gas; a power storage device that is charged with at least a part of power generated by the fuel cell; a control device that controls an output voltage of the fuel cell with, as an upper limit, a high-potential avoidance voltage lower than an open end voltage thereof; and a high-potential avoidance voltage setting device that variably sets the high-potential avoidance voltage in accordance with a state of charge of the power storage device.

The high-potential avoidance voltage is set variably in accordance with the state of charge of the power storage device, whereby the amount of power generated by the fuel cell during the high-potential avoidance control can be adjusted variably. This means that the amount of power with which the power storage device is charged during the high-potential avoidance control can be adjusted variably in accordance with the state of charge, and therefore, the time during which the high-potential avoidance control is performed can be extended as much as possible.

Here, when an amount of charge of the power storage device is small (when a charge capacity thereof is high), the storage device has enough room for storing power generated through the high-potential avoidance control even with the high-potential avoidance voltage being set to have a low voltage value. Therefore, the high-potential avoidance voltage setting device preferably sets the high-potential avoidance voltage lower as the amount of charge of the power storage device is smaller (as the charge capacity is higher). The target value for the high-potential avoidance voltage can be set low, thereby reducing deterioration of the fuel cell. On the other hand, when the amount of charge of the power storage device is large (or when the charge capacity is low), the power storage device does not have enough room for storing power generated through the high-potential avoidance control. In such a case, the high-potential avoidance voltage is preferably set high, thereby reducing the amount of power generated through the high-potential avoidance control.

The power storage device is not necessarily charged with all of the power generated during the high-potential avoidance control, and the power may be consumed by auxiliary devices. Even when the amount of charge of the power storage device is large (even when the charge capacity is low), power consumption by the auxiliary devices is expected, and therefore, the high-potential avoidance voltage setting device preferably changes the high-potential avoidance voltage in accordance with an amount of power consumed by the auxiliary devices.

The power with which the power storage device is charged is not necessarily limited to the power generated by the fuel cell. For example, the power storage may store regenerative power generated by a motor. The high-potential avoidance voltage setting device preferably changes the high-potential avoidance voltage in accordance with the regenerative power generated by the motor.

Also, the high-potential avoidance voltage setting device preferably sets, as the high-potential avoidance voltage, the highest voltage from among target values for the high-potential avoidance voltages respectively obtained from power with which the power storage device can be charged, power regenerated by a motor, and power consumed by auxiliary devices. As a result, overcharge of the power storage device can be prevented effectively.

Effect of the Invention

According to the invention, the high-potential avoidance voltage can be set variably in accordance with the state of charge of the power storage device, and accordingly, the time during which the high-potential avoidance control is performed can be extended as much as possible.

DESCRIPTION OF REFERENCE SYMBOLS

10: fuel cell system, 20: fuel cell stack, 30: oxidant gas supply system, 40: fuel gas supply system, 50: power system, 60: controller

BEST MODE FOR CARRYING OUT THE INVENTION

Now, an embodiment according to the present invention will be described with reference to the attached drawings.

Figure 1:
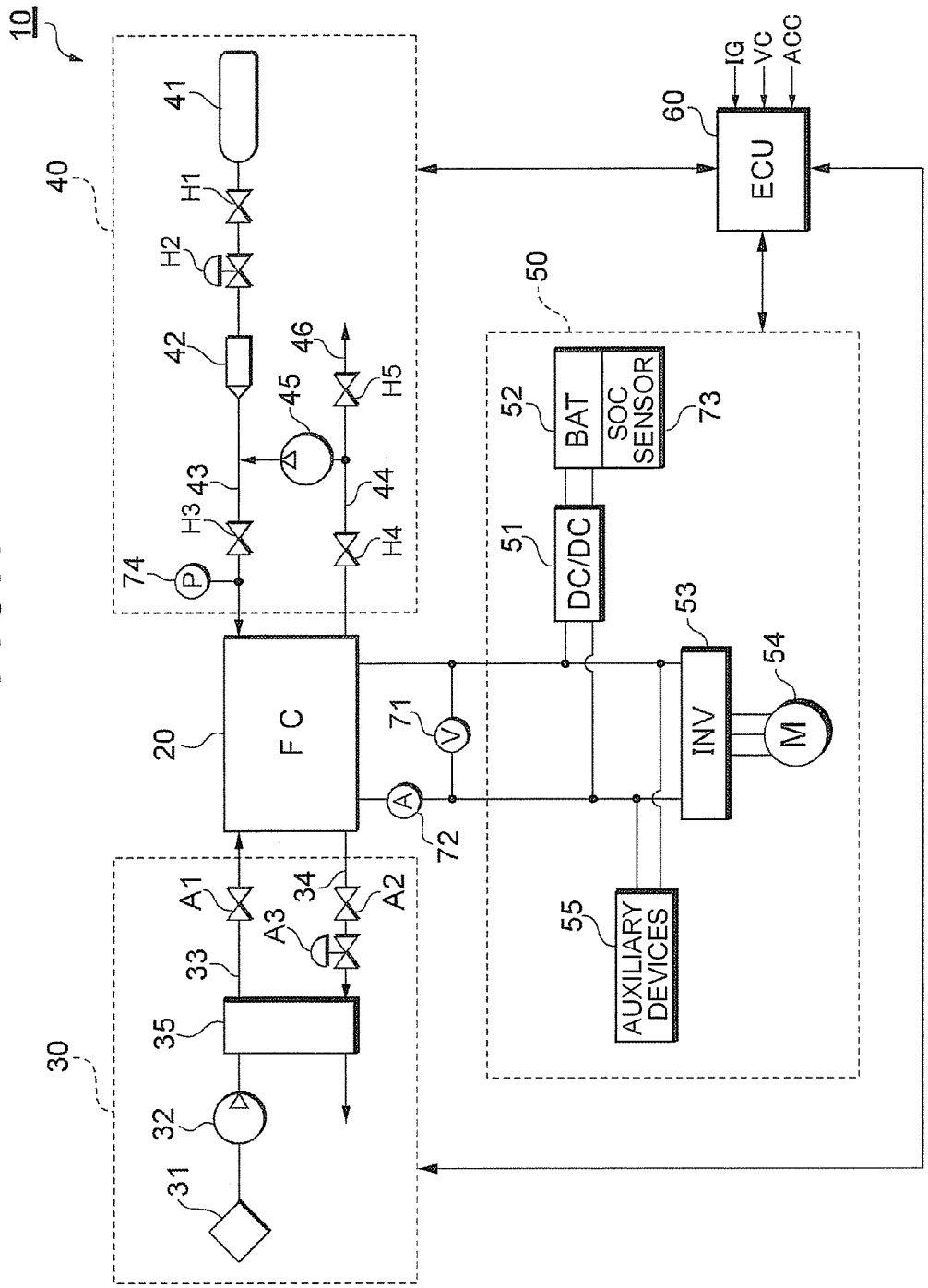
FIG. 1 is a system configuration diagram of a fuel cell system according to an embodiment of the invention.

FIG. 1 illustrates a system configuration of a fuel cell system 10 that functions as a power supply system mounted on a fuel cell vehicle.

The fuel cell system 10 functions as a power supply system mounted on a fuel cell vehicle, and is provided with: a fuel cell stack 20 that generates electric power upon the supply of reaction gases (fuel gas and oxide gas); an oxidant gas supply system 30 that supplies air serving as the oxidant gas to the fuel cell stack 20; a fuel gas supply system 40 that supplies a hydrogen gas serving as the fuel gas to the fuel cell stack 20; a power system 50 that controls charge/discharge of power; and a controller 60 that controls the entire system.

The fuel cell stack 20 is a solid polymer electrolyte cell stack in which a plurality of cells is stacked in series. In the fuel cell stack 20, the oxidization reaction of formula (1) below occurs at an anode, and the reduction reaction of formula (2) below occurs at a cathode. The electromotive reaction of formula (3) below occurs in the entire fuel cell stack 20.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The fuel cell stack 20 is provided with a voltage sensor 71 for detecting an output voltage (FC voltage) of the fuel cell stack 20 and a current sensor 72 for detecting an output current (FC current).

The oxidant gas supply system 30 has an oxidant gas path 33 in which an oxidant gas supplied to the cathode of the fuel cell stack 20 flows; and an oxidant-off gas path 34 in which an oxidant-off gas discharged from the fuel cell stack 20 flows. The oxidant gas path 33 is provided with: an air compressor 32 for taking in the oxidant gas from the atmosphere through a filter 31; a humidifier 35 for humidifying the oxidant gas pressurized by the air compressor 32; and a cutoff valve A1 for interrupting the supply of oxidant gas to the fuel cell stack 20. The oxidant-off gas path 34 is provided with: a cutoff valve A2 for interrupting the discharge of the oxidant-off gas from the fuel cell stack 20; a backpressure regulating valve A3 for regulating the supply pressure of the oxidant gas; and the humidifier 15 for exchanging water between oxidant gas (dry gas) and oxidant-off gas (wet gas).

The fuel gas supply system 40 includes: a fuel gas supply source 41; a fuel gas path 43 in which a fuel gas supplied from the fuel gas supply source 41 to the anode of the fuel cell stack 20 flows; a circulation path 44 for returning a fuel-off gas discharged from the fuel cell stack 20 to the fuel gas path 43; a circulation pump 45 for pumping the fuel-off gas in the circulation path 44 to the fuel gas path 43; and an exhaust/drain path 46 which branches off from the circulation path 44.

The fuel gas supply source 41 is constituted by a high-pressure hydrogen tank, hydrogen absorbing alloys, etc., and stores hydrogen gas at high pressure (e.g., 35 MPa or 70 MPa). When a cutoff valve H1 is opened, the fuel gas is flown from the fuel gas supply source 41 to the fuel gas path 43. The pressure of the fuel gas is reduced to approximately, e.g., 200 kPa by a regulator H2 and an injector 42, and the resultant gas is supplied to the fuel cell stack 20.

Note that the fuel gas supply source 41 may be constituted by a reformer for producing hydrogen-enriched reformed gas from hydrocarbon fuel and a high-pressure gas tank which brings the reformed gas produced by the reformer into a high-pressure state and stores the resultant gas.

The fuel gas path 43 is provided with: the cutoff valve H1 for interrupting or allowing the supply of the fuel gas from the fuel gas supply source 41; the regulator H2 for regulating the pressure of the fuel gas; the injector 42 for controlling the amount of the fuel gas to be supplied to the fuel cell stack 20;

a cutoff valve H3 for interrupting the supply of the fuel gas to the fuel cell stack 20; and a pressure sensor 74.

The regulator H2 is a device for regulating the pressure on the upstream side (primary pressure) to a preset secondary pressure, and is constituted by, e.g. a mechanical pressure reducing valve for reducing the primary pressure. The mechanical pressure reducing valve has a configuration in which: a casing having a backpressure chamber and a pressure regulating chamber separated by a diaphragm is provided; and, with the backpressure in the backpressure chamber, the primary pressure is reduced to a predetermined pressure in the pressure regulating chamber, thereby obtaining the secondary pressure. The regulators H2 is arranged upstream of the injector 42, whereby the pressure on the upstream side of the injector 42 can be reduced effectively. Therefore, the degree of freedom of the mechanical configuration (a valve body, casing, flow path, driving device, etc.) of the injector 42 can be enhanced. Also, the pressure on the upstream side of the injector 42 can be decreased, thereby preventing the valve body of the injector 42 from becoming difficult to move due to the increase in differential pressure between the upstream pressure and the downstream pressure of the injector 42. Accordingly, a variable pressure regulating width of the downstream pressure of the injector 42 can be extended, and also the reduction of responsibility of the injector 42 can be prevented.

The injector 42 is an electromagnetic drive type on-off valve having a configuration in which a valve body is directly driven with an electromagnetic driving force with a predetermined drive period so as to be separated from a valve seat, thereby controlling a gas flow rate and gas pressure. The injector 42 is provided with a valve seat having an injection hole through which gas fuel such as a fuel gas is injected, and is also provided with: a nozzle body for supplying and guiding the gas fuel to the injection hole; and a valve body which is held to be contained in a movable manner in an axial direction (gas flow direction) with respect to the nozzle body and which opens/closes the injection hole.

In this embodiment, the valve body of the injector 42 is driven by a solenoid, which is an electromagnetic device, and switching of the opening area of the injection hole in two levels can be attained with the on/off of a pulsed excitation current of electric power supplied to the solenoid. Control signals output from the controller 60 control a gas injection period and a gas injection time of the injector 42, thereby controlling the flow rate and pressure of the fuel gas with high accuracy. The injector 42 is configured such that the valve (valve body and valve seat) is driven to be opened and closed directly with an electromagnetic driving force, and has high responsibility since a drive period thereof can be controlled to attain the extent of high response. In the injector 42, in order to supply gas at a flow rate required for the downstream, at least one of the opening area (degree of opening) and the open time of the valve body provided in a gas flow path of the injector 42 is changed, thereby adjusting the flow rate (or hydrogen mol concentration) of the gas supplied to the downstream side.

Connected to the circulation path 44 is a cutoff valve H4 for interrupting the discharge of fuel-off gas from the fuel cell stack 20 and the exhaust/drain path 46 that branches off from the circulation path 44. The exhaust/drain path 46 is provided with an exhaust/drain valve H5. The exhaust/drain valve H5 operates in accordance with commands from the controller 60, thereby discharging the fuel-off gas containing impurities and water in the circulation path 44. By opening the exhaust/drain valve H5, the concentration of the impurities contained in the fuel-off gas in the circulation path 44 decreases, which enables the hydrogen concentration of the fuel-off gas circulating in a circulation system to increase.

The fuel-off gas discharged through the exhaust/drain valve H5 is mixed with the oxidant-off gas flowing in the oxidant-off gas path 34, and the mixture is diluted with a diluter (not shown). The circulation pump 45 circulates and supplies the fuel-off gas in the circulation system to the fuel cell stack 20 via a motor drive.

The power system 50 is provided with a DC/DC converter 51, a battery 52, a traction inverter 53, a traction motor 54 and auxiliary devices 55. The fuel cell system 10 is configured as a parallel hybrid system in which the DC/DC converter 51 and the traction inverter 53 each are connected in parallel with the fuel cell stack 20. The DC/DC converter 51 has a function of increasing a direct-current voltage supplied from the battery 52 and outputting the resultant direct-current voltage to the traction inverter 53, and has a function of decreasing the voltage of direct-current power generated by the fuel cell stack 20 or the voltage of regenerative power collected by the traction motor 54 via regenerative braking and discharging the battery 52 with the resultant power. These functions of the DC/DC converter 51 control charge and discharge of the battery 52. Also, voltage conversion control performed by the DC/DC converter 51 controls an operation point (output voltage and output current) of the fuel cell stack 20.

The battery 52 functions as a storage source of surplus power, a storage source of regenerative energy during regenerative braking, and an energy buffer during a load variation as a result of acceleration or deceleration of a fuel cell vehicle. The battery 52 is preferably constituted by a secondary battery such as a nickel/cadmium battery, a nickel/hydrogen battery, or a lithium secondary battery. The battery 52 is provided with an SOC sensor for detecting the SOC (state of charge).

The traction inverter 53 is, for example, a PWM inverter driven by a pulse width modulation method. In accordance with control commands from the controller 60, the traction inverter 53 converts a direct-current voltage output from the fuel cell stack 20 or the battery 52 into a three-phase AC voltage, thereby controlling a rotation torque of the traction motor 54. The traction motor 54 is, for example, a three-phase AC motor, and constitutes a power source of the fuel cell vehicle.

The auxiliary device 55 is a generic name for motors arranged in the respective units in the fuel cell system 10 (e.g., power sources for pumps, etc.), inverters for driving these motors, and various vehicle-mounted auxiliary devices (e.g., an air compressor, injector, cooling water circulation pump and radiator).

The controller 60 is a computer system which is provided with a CPU, ROM, RAM and an input/output interface, and controls the respective units of the fuel cell system 10. For example, when receiving an ignition signal IG output from an ignition switch, the controller 60 starts the operation of the fuel cell system 10, and obtains vehicle driving power and power consumption of the auxiliary devices based on an acceleration-opening-degree signal ACC output from an acceleration sensor, a vehicle speed signal VC output from a vehicle speed sensor, etc. The controller 60 performs power generation control using, as a power generation command value to the fuel cell stack 20, the larger value of: the power generation command value calculated from the total value of the vehicle driving power and the power consumption of the auxiliary devices; and the power command value calculated from the high-potential avoidance voltage.

The auxiliary-device power includes, e.g., power consumed by vehicle-mounted auxiliary devices (humidifier, air compressor, hydrogen pump, cooing water circulation pump, etc.), power consumed by devices necessary for vehicle driving (change gear, wheel control device, steering device, suspension device, etc.), and power consumed by devices arranged in an occupant space (air-conditioning device, illumination device, audio equipment, etc.).

The controller 60 determines an output power distribution between the fuel cell stack 20 and the battery 52, and controls the oxidant gas supply system 30 and the fuel gas supply system 40 so that the amount of power generated by the fuel cell stack 20 corresponds to target power. Also, the controller 60 controls the DC/DC converter 51 to adjust the output voltage of the fuel cell stack 20, thereby controlling the operation point (output voltage and output current) of the fuel cell stack 20. Moreover, in order to obtain a target torque in accordance with an acceleration opening degree, the controller 60 outputs, for example, respective AC voltage command values of a U-phase, a V-phase and a W-phase as switching commands to the traction inverter 53, and controls the output torque and revolution speed of the traction motor 54.

Figure 2:
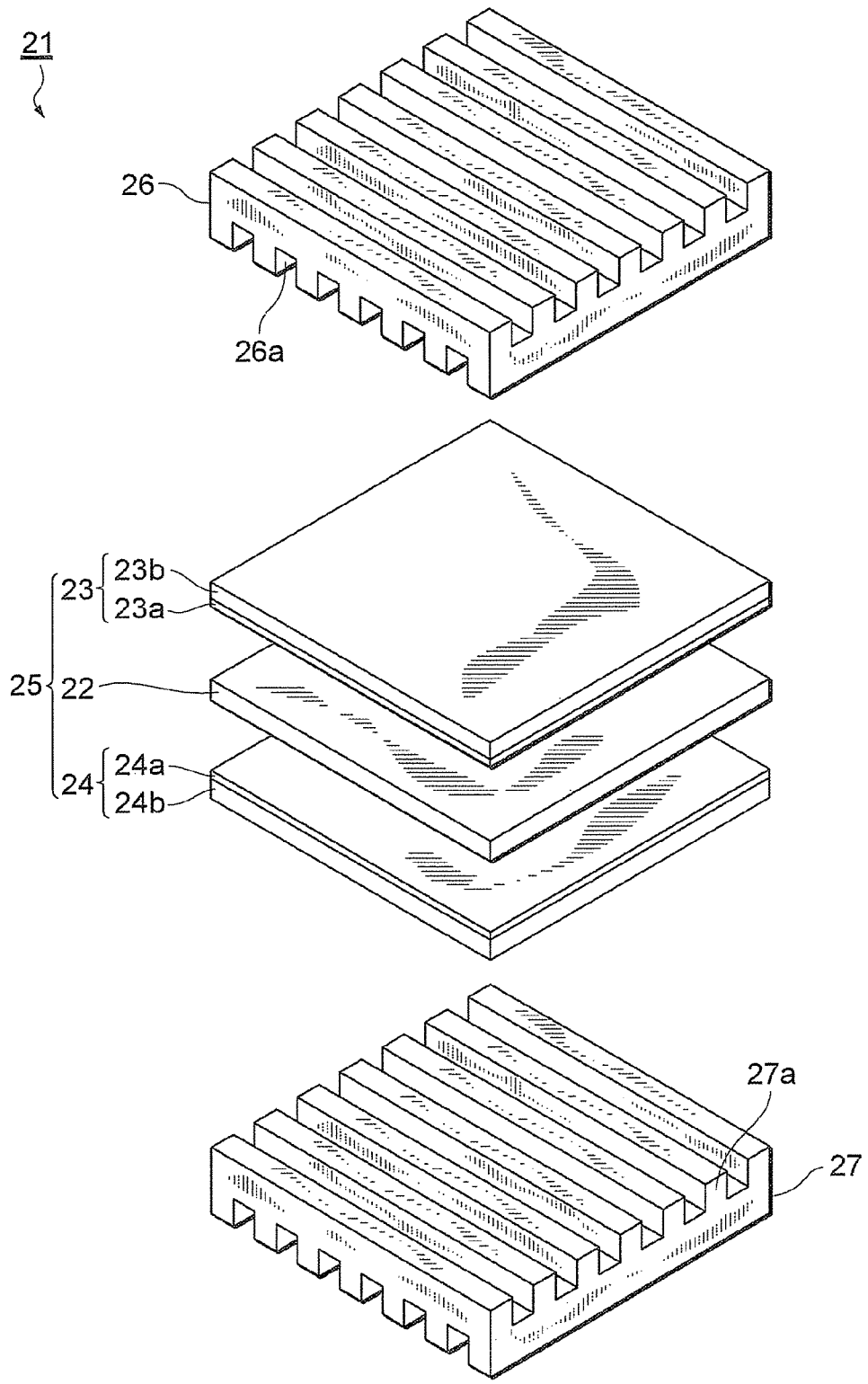
FIG. 2 is an exploded perspective view of a cell that constitutes a fuel cell stack.

FIG. 2 is an exploded perspective view of a cell 21 that constitutes the fuel cell stack 20.

The cell 21 is constituted by a polymer electrolyte membrane 22, an anode 23, a cathode 24 and separators 26 and 27. The anode 23 and the cathode 24 are diffusion electrodes, which sandwich the polymer electrolyte membrane 22 therebetween to form a sandwich structure. The separators 26 and 27 which are formed of gas impermeable conductive members sandwich the sandwich structure therebetween, and form flow paths for a fuel gas with respect to the anode 23 and flow paths for an oxidant gas with respect to the cathode 24. The separator 26 is formed with ribs 26a each having a concave shape in cross section. The anode 23 is in contact with the ribs 26a, whereby an opening portion of each of the ribs 26a is closed, so that the fuel gas flow paths are formed. The separator 27 is provided with ribs 27a each having a concave shape in cross section. The cathode 24 is in contact with the ribs 27a, whereby an opening portion of each of the ribs 27a is closed, so that the oxidant gas flow paths are formed.

The anode 23 contains carbon powder as its main constituent which carries a platinum-based metal catalyst (Pt, Pt—Fe, Pt—Cr, Pt—Ni, Pt—Ru, etc.), and has a catalyst layer 23a in contact with the polymer electrolyte membrane 22 and a gas diffusion layer 23b which is formed on a surface of the catalyst layer 23a and which has both permeability and electronic conductivity. Similarly, the cathode 24 has a catalyst layer 24a and a gas diffusion layer 24b. More specifically, the catalyst layers 23a and 24a each have a configuration in which: carbon powder carrying platinum or an alloy of platinum and other metal is dispersed in an appropriate organic solvent; an appropriate amount of electrolyte solution is added to the resultant to be pasted; and the resultant paste is deposited on the polymer electrolyte membrane 22 through screen printing. The gas diffusion layers 23b and 24b each are made of carbon cloth, carbon paper or carbon felt formed of threads of carbon fiber. The polymer electrolyte membrane 22 is a proton conducting ion-exchange membrane formed of a polymer electrolyte material such as fluororesin, and exerts satisfactory electric conductivity in its wet state. The polymer electrolyte membrane 22, the anode 23 and the cathode 24 constitute a membrane-electrode assembly 25.

Next, an execution condition and a prohibition condition for a high-potential avoidance control will be described.

Given as an example of the execution condition for the high-potential avoidance control is that both of the conditions (A1) that the SOC of the battery 52 is equal to or lower than SOC1 (e.g., 70%) and (B1) that a judgment is being made as to the detection of gas leakage based on a pipe pressure (value detected by the pressure sensor 74) of the fuel gas supply system 30 are satisfied. Meanwhile, given as an example of the prohibition condition for the high-potential avoidance control is that either of the conditions (A2) that the SOC of the battery 52 is equal to or higher than SOC2 (e.g., 75%) and (B2) that a judgment is being made as to the detection of gas leakage based on the pipe pressure of the fuel gas supply system 30 is satisfied.

When the execution condition for the high-potential avoidance control is satisfied, the output voltage of the fuel cell stack 20 is limited to be a voltage equal to or lower than a high-potential avoidance voltage (upper limit voltage) below an open end voltage of the fuel cell stack 20. The high-potential avoidance voltage is preferably a voltage that satisfies the condition of being within the voltage range in which the platinum catalyst contained in the catalyst layers 23a and 24a of the fuel cell stack 20 does not dissolve. In addition to this condition, the high-potential avoidance voltage is preferably a voltage that satisfies the condition of being within the voltage range in which, when the output voltage of the fuel cell stack 20 is kept at the high-potential avoidance voltage in the stop state of the supply of reaction gases to the fuel cell stack 20, the power generated by the fuel cell stack 20 can be consumed by the auxiliary devices 55. In the fuel cell stack 20, when the potential of the cathode 24 is held high, in particular, during a low-density current operation or stand-by operation, the platinum catalyst contained in the catalyst layer 24a may dissolve. The high-potential avoidance voltage may have a variable control value that varies in accordance with, e.g., the SOC of the battery 52 or the power consumption of the auxiliary devices 55.

Meanwhile, when the prohibition condition for the high-potential avoidance control is satisfied, the output voltage of the fuel cell stack 20 is allowed to be increased to the open end voltage.

The above description shows the example of setting the determination conditions for on/off switching of the high-potential avoidance control function with the SOC of the battery 52 serving as a reference. However, determination conditions for performing on/off switching of the high-potential avoidance control function may be set with the charge capacity of the battery 52 serving as a reference. For example, when the charge capacity of the battery 52 becomes lower than a predetermined threshold, the high-potential avoidance control function may be shifted from off to on; meanwhile, when the charge capacity of the battery 52 becomes equal to or higher than the predetermined threshold, the high-potential avoidance control function may be shifted from on to off. Also, regarding the execution condition for the high-potential avoidance control, the above conditions (A1) to (B1) may be changed to other conditions, and alternatively, other conditions may further be added. Regarding the prohibition condition for the high-potential avoidance control, the above conditions (A2) to (B2) may be changed to other conditions, and alternatively, other conditions may further be added.

Next, a method of calculating a high-potential avoidance control will be described.

The controller 60 functions as a high-potential avoidance voltage setting device that variably sets a target value for the high-potential avoidance voltage in accordance with the state of charge of the battery 52, the consumption power of the auxiliary devices 55, etc. The high-potential avoidance voltage is not treated as a fixed value but as a variable control value that always varies in accordance with the state of charge of the battery 52, the power consumption of the auxiliary devices 55, etc. The high-potential avoidance voltage is variably set, whereby the amount of power generated by the fuel cell stack 20 during the high-potential avoidance control can be adjusted variably. This means that the amount of power with which the battery 52 is charged during the high-potential avoidance control can be adjusted variably, and therefore, the time during which the high-potential avoidance control is performed can be extended as much as possible, thereby reducing deterioration of the fuel cell stack 20.

For example, when the amount of charge of the battery 52 is small (when the charge capacity is high), even if the high-potential avoidance voltage is set to have a low voltage value, the battery 52 has enough room to store the power generated through the high-potential avoidance control. Therefore, in such a case, the high-potential avoidance voltage is preferably set low so as to reduce deterioration of the fuel cell stack 20. On the other hand, when the amount of charge of the battery 52 is large (or when the charge capacity is low), the battery 52 does not have enough room to store the power generated through the high-potential avoidance control. Therefore, in such a case, the high-potential avoidance voltage is preferably set high so as to reduce the amount of power generated through the high-potential avoidance control.

Figure 3:
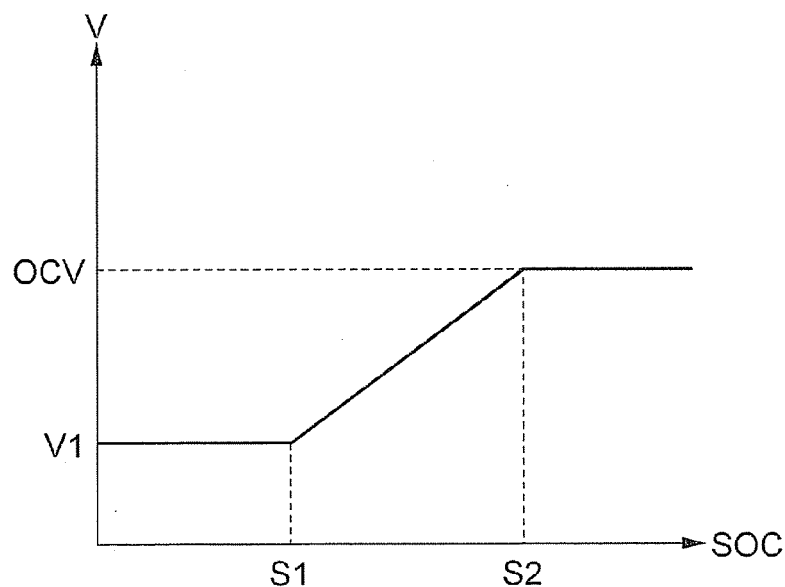
FIG. 3 shows map data showing the correspondence between the SOC of a battery and a high-potential avoidance voltage.

More specifically, as shown in FIG. 3, when an amount of charge SOC of the battery 52 is below S1, the high-potential avoidance voltage is set to V1; meanwhile, when the SOC is equal to or higher than S2, the high-potential avoidance voltage is set to OCV (open end voltage) (Note that S1<S2 and V1<OCV are assumed.). When the SOC is equal to or higher than S1 and is below S2, the high-potential avoidance voltage may be set to monotonically increase between V1 and OCV in a linear or non-linear manner with the increase of the SOC.

Figure 4:
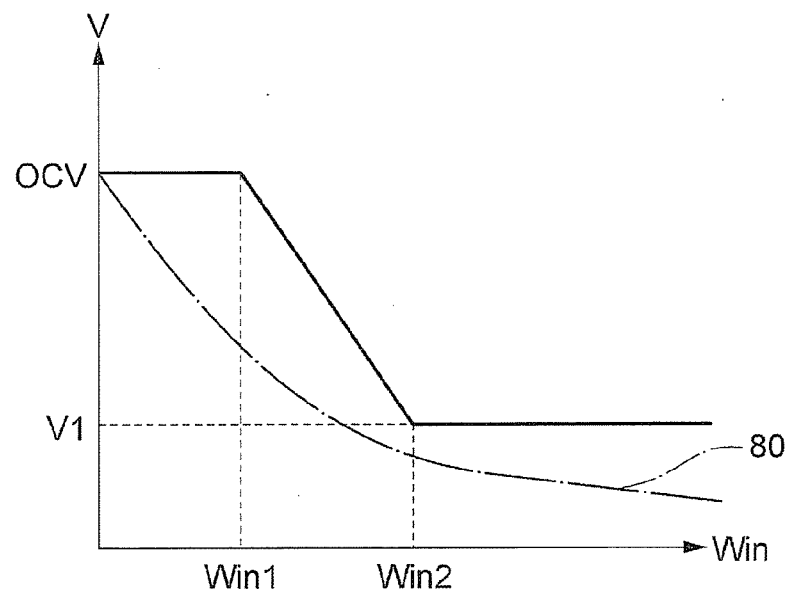
FIG. 4 shows map data showing the relationship between a charge capacity of a battery and a high-potential avoidance voltage.

Also, as shown in FIG. 4, when a charge capacity Win of the battery 52 is equal to or higher than Win2, the high-potential avoidance voltage is set to V1; meanwhile, when the Win is below Win1, the high-potential avoidance voltage is set to OCV (Note that Win1<Win2 is assumed.). When the Win is equal to or higher than Win1 and is below Win2, the high-potential avoidance voltage may be set to monotonically decrease between OCV1 and V1 in a linear or non-linear manner with the increase of the Win.

The power generated through the high-potential avoidance control is provided for charge of the battery 52, and also is consumed by the auxiliary devices 55. Even when the amount of charge of the battery 52 is large (when the charge capacity is low), when a large amount of the power consumed by the auxiliary devices 55 is expected, the high-potential avoidance voltage is preferably set low so as to reduce deterioration of the fuel cell stack 20.

Figure 5:
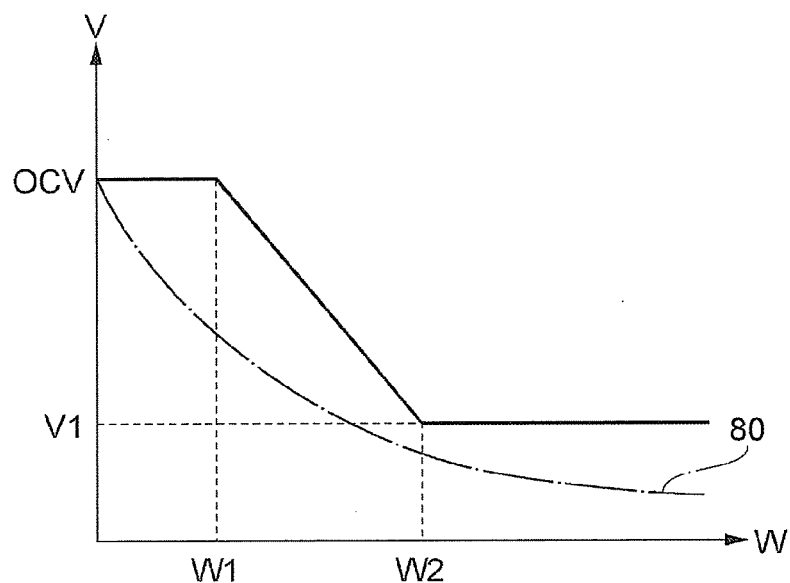
FIG. 5 shows map data showing the relationship between the total value of a charge capacity of a battery and power consumption of auxiliary devices and a high-potential avoidance voltage.

More specifically, as shown in FIG. 5, when the total value W of the charge capacity of the battery 52 and the power consumption of the auxiliary devices 55 is equal to or higher than W2, the high-potential avoidance voltage is set to V1; meanwhile, when W is below W1, the high-potential avoidance voltage is set to OCV (Note that W1<W2 is assumed.). When W is equal to or higher than W1 and is below W2, the high-potential avoidance voltage may be set to monotonically decrease between OCV and V1 in a linear or non-linear manner with the increase of W.

In the graphs shown in FIGS. 4 and 5, the high-potential avoidance voltage is preferably set to be located above a P-V characteristic (power-current characteristic) curve 80 of the fuel cell stack 20. This means that the total value of the power with which the battery 52 can be charged and the power that can be consumed by the auxiliary devices 55 is larger than the power generated through the high-potential avoidance control. Accordingly, overcharge of the battery 52 can be avoided.

The controller 60 can set, as the high-potential avoidance voltage, the highest voltage from among the high-potential avoidance voltage obtained from the amount of charge SOC of the battery 52 (FIG. 3), the high-potential avoidance voltage obtained from the charge capacity Win of the battery 52 (FIG. 4), and the high-potential avoidance voltage obtained from the total value W of the charge capacity of the battery 52 and the power consumption of the auxiliary devices 55 (FIG. 5). Accordingly, overcharge of the battery 52 can be prevented effectively.

The power with which the battery 52 is charged is not necessarily limited to the power generated by the fuel cell stack 20. For example, the battery 52 may store power regenerated by the traction motor 54 during vehicle braking. During backing of regeneration performed by the traction motor 54, a motor regeneration torque is converted into power, and the battery 52 is charged with the resultant power. The power balance shown below is provided when the high-potential avoidance control is performed also during regenerative braking.

$$\text{Power with which the battery is charged} + \text{power consumed by the auxiliary devices} = \text{power regenerated by the motor} + \text{power generated by the fuel cell} \qquad (4)$$

As shown in expression (4), when the power generated by the fuel cell is large during vehicle braking, the power regenerated by the motor decreases accordingly, and thus, a sufficient braking torque cannot be reserved. Therefore, during vehicle braking, the high-potential avoidance voltage is preferably increased to reduce the power generated by the fuel cell, thereby reserving a sufficient braking torque. In view of this, the controller 60 variably sets the high-potential avoidance voltage such that expression (5) below is employed during vehicle braking.

$$\text{Power with which the battery is charged} + \text{power consumed by the auxiliary devices} \geq \text{power regenerated by the motor} + \text{power generated by the fuel cell} \qquad (5)$$

Figure 6:
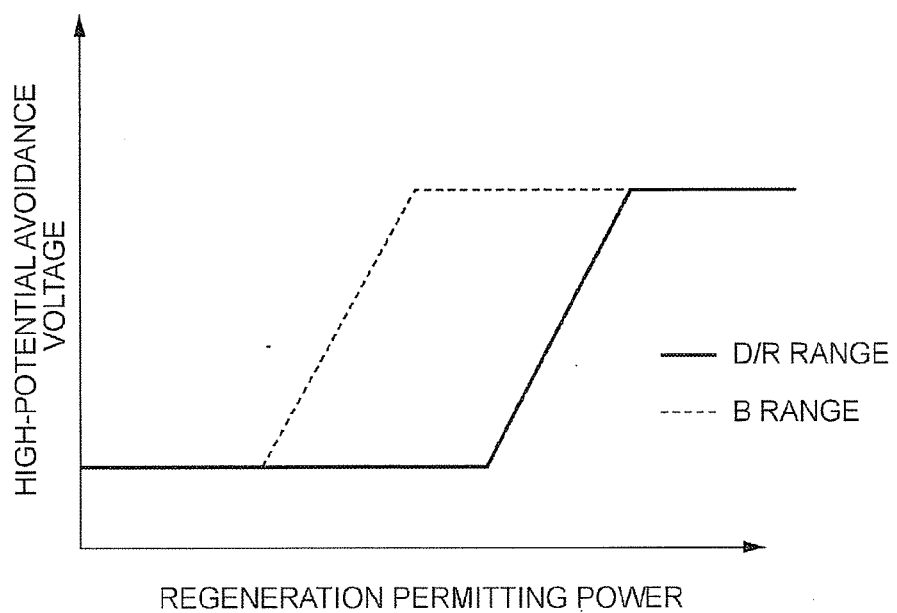
FIG. 6 shows map data showing the relationship between regeneration permitting power and a high-potential avoidance voltage.

The high-potential avoidance voltage derived from the relation of expression (5) may be held, as map data such as that shown in FIG. 6, in the ROM in the controller 60. In FIG. 6, the axis of ordinate indicates regeneration permitting power, and the axis of abscissa indicates a high-potential avoidance voltage. A braking torque differs between a B (brake) range and a D/R (drive/reverse) range, and therefore, different kinds of map data are shown. The solid line indicates the map data in the D/R range, and the dashed line indicates the map data in the B range.

Also, the high-potential avoidance voltage derived from the relation of expression (5) may be calculated through a real-time operation on a vehicle instead of being held in advance as the map data.

Moreover, the controller 60 sets, as the high-potential avoidance voltage, the highest voltage from among not only the high-potential avoidance voltage obtained from the amount of charge SOC of the battery 52 (FIG. 3), the high-potential avoidance voltage obtained from the charge capacity Win of the battery 52 (FIG. 4), and the high-potential avoidance voltage obtained from the total value W of the charge capacity of the battery 52 and the power consumption of the auxiliary devices 55 (FIG. 5) but also the high-potential avoidance voltage derived from the relation of expression (5).

Although the above embodiment has described the case of the use of the fuel cell system 10 as a vehicle-mounted power supply system, the use of the fuel cell system 10 is not limited to this case. For example, the fuel cell system 10 may be mounted as a power source not only on fuel cell vehicles but also on the other mobile objects (e.g., a robot, ship and airplane). The fuel cell system 10 in this embodiment may also be used as power generating equipment (stationary power generating systems) for e.g., houses and buildings.

What is claimed is:

1. A fuel cell system comprising:
a fuel cell that generates electric power upon a supply of a reaction gas;
a power storage device that is charged with at least a part of power generated by the fuel cell;
a control device including a high potential avoidance voltage setting device, the control device programmed to control an output voltage of the fuel cell with, as an upper limit, a high-potential avoidance voltage lower than an open end voltage thereof and variably set the high-potential avoidance voltage in accordance with a current state of charge of the power storage device based on a first threshold value and a second threshold value of the state of charge, wherein the second threshold value is higher than the first threshold value,
wherein the high-potential avoidance voltage, which corresponds to the state of charge lower than the first threshold value, is lower than the high-potential avoidance voltage which corresponds to the state of charge between the first and the second threshold value, and
wherein the high-potential avoidance voltage, which corresponds to the state of charge higher than the second threshold value, is higher than the high-potential avoidance voltage which corresponds to the state of charge between the first and the second threshold value.

2. The fuel cell system according to claim 1, wherein the control device is programmed to set the high-potential avoidance voltage lower as an amount of charge of the power storage device is smaller.

3. The fuel cell system according to claim 1, wherein the control device is programmed to set the high-potential avoidance voltage lower as a charge capacity of the power storage device is higher.

4. A fuel cell system comprising:
a fuel cell that generates electric power upon a supply of a reaction gas;
a power storage device that is charged with at least a part of power generated by the fuel cell;
a control device including a high potential avoidance voltage setting device, the control device programmed to control an output voltage of the fuel cell with, as an upper limit, a high-potential avoidance voltage lower than an open end voltage thereof and variably set the high-potential avoidance voltage in accordance with a state of charge of the power storage device,
wherein the control device, in accordance with an amount of power consumed by auxiliary devices, or in accordance with regenerative power generated by a motor, or both, is programmed to change the high-potential avoidance voltage, that was variably set in accordance with a state of charge of the power storage device.

5. A fuel cell system comprising:
a fuel cell that generates electric power upon a supply of a reaction gas;
a power storage device that is charged with at least a part of power generated by the fuel cell;
a control device including a high potential avoidance voltage setting device, the control device programmed to control an output voltage of the fuel cell with, as an upper limit, a high-potential avoidance voltage lower than an open end voltage thereof and variably set the high-potential avoidance voltage in accordance with a state of charge of the power storage device,
wherein the control device is programmed to change the high potential avoidance voltage that was variable set in accordance with the state of charge of the power storage device to the highest voltage from among target values for the high-potential avoidance voltages respectively obtained from power which the power storage device can be charged with, power regenerated by a motor, and power consumed by auxiliary devices.

* * * * *

UNITED STATES PATENT AND TRADEMARK OFFICE
CERTIFICATE OF CORRECTION

PATENT NO. : 8,722,265 B2
APPLICATION NO. : 12/743896
DATED : May 13, 2014
INVENTOR(S) : Umayahara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this
Twenty-ninth Day of September, 2015

Michelle K. Lee
*Director of the United States Patent and Trademark Office*